(12) United States Patent
Lee

(10) Patent No.: US 7,619,966 B2
(45) Date of Patent: Nov. 17, 2009

(54) HYBRID VIRTUAL PRIVATE LAN EXTENSIONS

(75) Inventor: Cheng-Yin Lee, Ottawa (CA)

(73) Assignee: Alcatel Lucent, Paris (FR)

( * ) Notice: Subject to any disclaimer, the term of this patent is extended or adjusted under 35 U.S.C. 154(b) by 1238 days.

(21) Appl. No.: 10/724,775

(22) Filed: Dec. 2, 2003

(65) Prior Publication Data
US 2004/0174887 A1    Sep. 9, 2004

Related U.S. Application Data

(63) Continuation-in-part of application No. 10/369,568, filed on Feb. 21, 2003, now abandoned.

(51) Int. Cl.
*G01R 31/08* (2006.01)

(52) U.S. Cl. .................. 370/218; 370/231; 370/242; 370/256

(58) Field of Classification Search ......... 370/216–228, 370/231, 235, 242–245, 256, 258, 353, 395.2, 370/395.3; 709/238, 239, 242, 243
See application file for complete search history.

(56) References Cited

U.S. PATENT DOCUMENTS

| | | | |
|---|---|---|---|
| 6,530,032 B1 * | 3/2003 | Shew et al. ............ 714/4 |
| 6,611,502 B1 | 8/2003 | Seaman | |
| 6,904,018 B2 * | 6/2005 | Lee et al. ............ 370/238 |
| 7,082,101 B2 * | 7/2006 | Kim et al. ............ 370/225 |
| 7,289,431 B2 * | 10/2007 | Iijima ............ 370/218 |
| 7,360,099 B2 * | 4/2008 | DiFalco et al. ........ 713/194 |
| 2002/0085567 A1 | 7/2002 | Ku et al. | |
| 2002/0172148 A1 * | 11/2002 | Kim et al. ........... 370/216 |
| 2002/0186664 A1 | 12/2002 | Gibson et al. | |
| 2003/0088698 A1 * | 5/2003 | Singh et al. .......... 709/239 |
| 2003/0108051 A1 | 6/2003 | Bryden et al. | |

FOREIGN PATENT DOCUMENTS

| | | |
|---|---|---|
| EP | 1388978 A1 * | 2/2004 |
| EP | 1732281 A1 * | 12/2006 |
| WO | WO 02/19595 | 3/2002 |

OTHER PUBLICATIONS

P. Hegyi et al., "Shared Protection of Virtual Private Networks with Traffic Concentration," Oct. 2003, Fourth International Design of Reliable Communicaitons Networks, DRCN, pp. 448-454.*
XP-002320887, Using Management Center for VPN Routers 1.0, Cisco Systems, 2002.
IEEE Standards for Local and Metropolitan Area Networks, 802.1Q Virtual Bridged Local Area Networks, IEEE 2002.
Lee, C., et al., Hybrid Virtual Private LAN Service, Internet Engineering Task Force, Jun. 2003.
Lasserre, M., et al., Virtual Private LAN Over MPLS, L2VPN Working Group, Feb. 2005.

* cited by examiner

*Primary Examiner*—Donald L Mills
(74) *Attorney, Agent, or Firm*—Kramer & Amado, P.C.

(57) ABSTRACT

This invention is applicable to a Virtual Private LAN service built using multiple point-to-point Ethernet services from a network operator, where the bridging and the transport/tunneling of Ethernet frames to a remote site are decoupled. The learning bridge function (including MAC address learning and flooding) is performed at customer equipment CE devices, while the tunneling is performed at provider edge PE nodes. The models described here for this VPN refer to hub redundancy, site-to-site SLA guarantees and address discovery in the case of hybrid connections.

16 Claims, 4 Drawing Sheets

HYBRID VIRTUAL PRIVATE LAN EXTENSIONS

PRIORITY INFORMATION

This patent application is a continuation in part of the U.S. patent application Ser. No. 10/369,568, entitled "Customer Site Bridged Emulated LAN Services Via Provider Provisioned Connections", filed on Feb. 21, 2003 now abandoned.

FIELD OF THE INVENTION

The invention relates to communications networks, and in particular to virtual private LANs (VPL).

BACKGROUND OF THE INVENTION

A Local Area Network (LAN) is a collaborative environment including interconnected network nodes, which share services and exchange information. LAN technologies, such as Ethernet technologies, specified in the IEEE 802 standard, enable the interconnection of network nodes within a limited distance typically spanning a building. Ethernet technologies enjoy a very wide use and therefore are supported on a very large portion of installed communications infrastructure. Typically the information is conveyed in accordance with the Internet Protocol (IP), which is widely accepted as a LAN Layer3 (L-3) protocol.

As many enterprises (government organizations, companies, etc) grew beyond what can be housed in a single building, the need to share services and information freely between multiple sites evolved accordingly. These sites may be distributed over many sites either in a city, in a country, or internationally. Thus, the need to connect the site LANs, or LAN segments shared by the same user resulted in the development of the emulated LAN (ELAN) technologies. While the LAN segments of an emulated LAN generally use the same communication protocol, which may use a different communication protocol. A service provider must operate the emulated LANs for a certain customer seamlessly, as if they were one customer network (a virtual LAN.

Service provider networks typically manage regional public communications networks generally referred to as Metropolitan Area Networks (MANs), to which customer LANs connect. At a higher interconnection level, interconnectivity is provided between service provider communications network MANs via carrier communications networks, the combination forming what are known as Wide Area Networks (WANs). The Internet is a public conglomeration of WANs.

Most service provider communications networks operate in accordance with the IP protocol because of the wide utilization of the IP protocol in customer LANs. However, service provider networks may use various technologies such as SONET, ATM, Frame Relay, IP and interfaces that are provided to the respective LANs. Virtual LAN (VLAN) technologies extend the IEEE 802 standard specification to address customer traffic differentiation in a MAN/WAN environment to provide free exchange of information between LAN segments at different customer sites within a protected emulated LAN context. Providing VLAN support is the most complex and challenging of all Ethernet based services.

VLAN technologies as defined in IEEE 802.1q require the use of a unique global VLAN identifier (VLAN ID) for each customer. The VLAN ID is to be used globally to tag exchanged information within confines of the customer's emulated LAN context, when conveyed in the service provider's communications network and/or the carrier's communications network. According to this standard, different customer LAN segments associated with the same VLAN and connected to different parts of service providers communications networks from corresponding sites, share a common globally unique VLAN ID. Depending on the implementation, Customer Located Equipment (CLE) providing connectivity between customer LANs, service provider communications network nodes, and/or carrier communications network nodes need to be configured with globally unique VLAN IDs. As multiple entities, such as different customer sites, multiple service providers, and multiple carriers need to differentiate the customer traffic, the limited VLAN ID space available must be carefully managed overall. This introduces a large management overhead as the IEEE 802.1q standard specification only provides for about 4000 useful VLAN IDs and is therefore capable to support only up to 4000 emulated LANs.

Solutions providing central management of the limited VLAN ID space have been proposed and implemented, however these are not satisfactory as the entity providing the central VLAN ID space management does not necessarily have a direct relationship with each customer. Today, emulated LAN services have to be manually provisioned which is time consuming, error prone, and requires coordination of efforts involving multiple entities to ensure the VLAN IDs are unique throughout.

The parent US Patent Application identified above provides a method of provisioning virtual private LAN services, also known as VPNS, that uses tunneling technologies via virtual connections established between Provider Edge equipment (PEs), and learning bridge functionality at Customer Located Equipment (CLE). To summarize, the customer located equipment performs the learning bridge functions, including MAC address learning and flooding, while the provider equipment connected on the service provider network performs tunneling. This separation of functionality results in a less restrictive use of VLAN IDs, which need only to be unique in the access network portion of the service provider's network. Other advantages of this separation are that the PEs are not burdened with the bridging function, unique global VLAN IDs are not required, and the solution is simple, scalable and oriented to a leased line business model/operation.

On the other hand, adoption of the VPN approach in the parent U.S. Patent Application raises new issues that need to be addressed, notably hub redundancy, meaningful site to site service level agreements (SLA) and interconnection of sites with different access media.

In order to be successful, data communication service providers and/or operators need to offer emulated LAN services, which work at least as well as what customers themselves can provision. Thus, there is a need for a service provider/operator to provision emulated LAN services with high resiliency at low cost, enabling faster connectivity recovery than allowed by the existing services.

There have been previous attempts to provide SLA site-to-site in an emulated LAN context. However, it was thought that the provider edge equipment would need to filter or rate-limit the traffic based on the destination MAC address of the service. This is not a simple problem, as it requires the provider edge equipment to keep track of the MAC addresses of the frames going to different sites. More particularly, it is not known a priori how much bandwidth is required from an end customer site to other sites.

Existing solutions only allow emulated LAN services to be offered in a hose model, whereby the provider polices the ingress bandwidth of a customer UNI to an emulated LAN service. Since all that is known is the amount of bandwidth a site can send to the emulated LAN, this model does not allow a provider to provision the network for this service.

There is a need for a service provider to offer emulated LAN services with specified SLA site-to-site or UNI to UNI SLA.

Still further, there is a need for network provider/operator to provision emulated LAN services for sites with different access media.

SUMMARY OF THE INVENTION

It is an object of the invention to provide hub redundancy in a virtual private LAN enabled with decoupled bridging and tunneling capabilities.

Another object of the invention is to enable the service provider to police/allocate the ingress bandwidth used by a customer UNI to an emulated LAN service.

It is another object of the invention to provide methods of interconnecting customer equipment that have different access media and are located at different sites of an emulated LAN.

According to one aspect of the invention, redundant hub-spoke configuration for a virtual private LAN (VPN) of the type having a plurality of emulated LANs (ELANs), each connected at a provider edge (PE) node over a service provider network, comprising: a first hub node serving client equipment (CE) devices connected on a first ELAN, a spoke node serving CE devices on a second ELAN; a first point-to-point link L1 for interconnecting the hub node and the spoke node; and a second hub node interconnected with the first hub node, wherein whenever the first link L1 fails, the second hub node establishes communication with the spoke node over a second point-to-point link L2.

A method for recovering the traffic in case of a failure in a hub-spoke configuration for a virtual private LAN (VPN) of the type having a plurality of emulated LANs (ELANs), each connected at a service provider edge (PE) node over an access link, a method for recovering the traffic in case of a failure, is also provided. The method comprises: a) transmitting traffic from a first hub node to a spoke node over a first point-to-point link established between a first PE at the first hub node and a third PE at the spoke node; b) at the first PE, monitoring the traffic on the first link; c) responsive to a fault on the link, signaling the fault from the third PE to the first PE node; and d) transmitting traffic form a second hub node to the spoke node over a second point-to-point link established between a second PE at the second hub node and the third PE node.

In a further aspect, the invention is concerned with a method of providing a multipoint emulated LAN connecting a plurality of sites with site-to-site bandwidth guarantees, comprising: configuring a second PE node to perform multipoint switching of the traffic in a first VC/tunnel established between a first site and the second site, to one of a second or a third site, based on the MAC address; configuring a first provider edge (PE) node to operate as a spoke of the first PE to perform point-to-point switching of the first VC/tunnel, and of a second VC/tunnel established between the third site and the second site; and allocating a first bandwidth to the first VC/tunnel and a second bandwidth to the second VC/tunnel and rate limiting traffic in each the first VC/tunnel and the second VC/tunnel to the respective allocated bandwidth.

The invention also provides a virtual private LAN (VPL) of the type having a plurality of emulated LANs, each emulated LAN comprising an access device connected to a service provider edge PE node along an access link identified by a data link connection identifier, and a first PE is interconnected with a second PE along a point-to-point link, with a method of establishing a hybrid connection between a first customer equipment CE device on the VPL and a second CE device that operates according to a different communication protocol. The method comprises a) at the second CE device, performing bridged encapsulation of the traffic and transmitting a second type protocol data unit (PDU) over a second access link to a second provider edge (PE) node; b) at the second PE node, decapsulating traffic form the PDU, and transmitting the traffic into a service provider type PDU over a dedicated point-to-point tunnel across the service provider network to a first PE node; c) at the first PE node, decapsulating the traffic from the service provider PDU, converting it to a first type PDU and transmitting the PDU to a first access device over a first access link; d) at the first access device, bridging the PDU to the first CE device.

In a still further aspect, the invention provides a virtual private LAN (VPL) of the type having a plurality of emulated LANs, each emulated LAN comprising an access link to a service provider edge PE node identified by a data link connection identifier, with a method of establishing a hybrid connection between a first customer equipment CE device on the VPL and a second CE device that operates according to a different communication protocol. The method comprises: a) at the first CE device, bridging a first type PDU to a first PE node over a first access link; c) at the first PE node, decapsulating traffic from the first type PDU, encapsulating the traffic into a service provider type PDU and transporting it over a dedicated point-to-point tunnel across the service provider network to a second PE node; and d) at the second PE, decapsulating traffic from the service-provider PDU, performing bridged encapsulation of the traffic in a second type PDU and sending it to the second CE device over a second access link.

According to still another aspect the invention provides a method of establishing a hybrid connection in VPL of the type having a plurality of emulated LANs, each emulated LAN comprising an access link to a service provider edge PE node identified by a data link connection identifier. The hybrid connection is established between a first customer equipment CE device on the VPL and a second CE device that operates according to a different communication protocol, the method comprising: a) at the second CE device, performing routed encapsulation of traffic into a second type PDU and transmitting the second type PDU to a second PE node over a second access link; b) at the second PE node, decapsulating traffic from the second type PDU, encapsulating the traffic into a subscriber network type PDU and transmitting it over a dedicated point-to-point tunnel to a first PE node; c) at the first PE node, decapsulating the traffic received over the dedicated point-to-point tunnel, encapsulating it into a first-type PDU, and sending first-type PDU to an access device over a second access link; and at the access device, bridging the PDU to the first CE device.

Advantageously, the invention enables a provider provisioned LAN services that provide resiliency at lower cost, fast convergence when a link fails. As well, multipoint connectivity enables reducing the amount of point-to-point links provisioning that and end customer must perform.

Clearly, measurable SLA and not merely duplicating an emulated LAN service that end customer can provision itself, benefits both the end customer and the service provider. In addition, since the SLA can be specified clearly and the network service is resilient, the ELAN with these features allows customers to run VoIP and real time service.

Still another advantage of the invention is that it provides simple mechanisms for enabling communication between hybrid customer devices connected over the same ELAN.

BRIEF DESCRIPTION OF THE DRAWINGS

The features and advantages of the invention will become more apparent from the following detailed description of the preferred embodiment(s) with reference to the attached diagrams wherein.

DETAILED DESCRIPTION OF THE EMBODIMENTS

Figure 1:
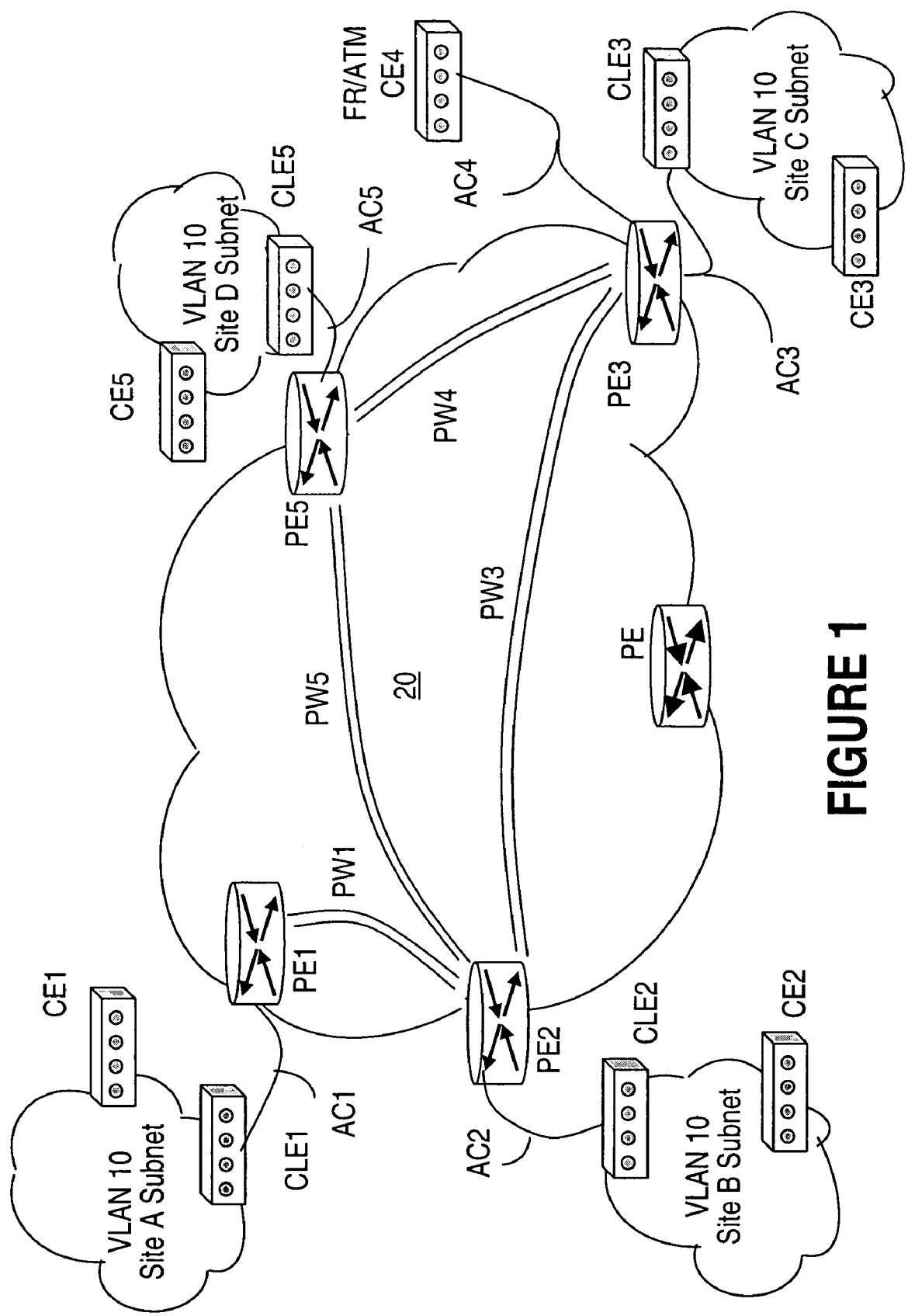
FIG. 1 is a block diagram of a hybrid emulated LAN.

FIG. 1 provides an example of an emulated LAN as described in the parent Patent Application with hybrid end-to-end connectivity. In this example, a service provider network 20 comprises edge nodes PE1, PE2, PE3 and PE5, each connecting the subnetworks (subnets) of an emulated LAN 10. Network 20 interfaces with a respective customer located equipment CLE, here denoted with CLE1, CLE2, CLE3 and CLE5. As also described in the parent Patent Application, each subnet Snet1, Snet2, Snet3, and Snet5 serves customer equipment, denoted here with CE1, CE2, CE3, CE4, CE5.

In the approach shown in FIG. 1, provisioning of virtual private LAN services is enabled by separating the tunneling and bridging functionality at the edge of the service provider network. Here, the CLEs connected to the customer CE devices in the respective emulated LAN perform the learning bridge functions, including MAC address learning and flooding, while the PEs, connected on the service provider network performs tunneling of the PDUs over the service provider network along PWs (pseudo-wires). As a result, VLAN IDs need only be unique in the access network portion of the service provider's network, and the PEs do not need to perform the bridging function.

The separation achieved between the requirements of provisioning VPL services and the transport technologies used in the access network, enables service providers to leverage the existing installed infrastructure and eases the migration to new network infrastructure when needed, without affecting the provisioned VPL services. The PE devices connected over point-to-point tunnels, as illustrated at PW1, PW3, PW4, PW5. A "tree" configuration is preferred over a "full-mesh" configuration for the PWs as described in the parent patent application.

For a large number of sites that need to be interconnected, grouping the CE sites into different subnets (emulated LAN) allows the VLAN to be scaled, while still reducing provisioning and link states within one subnet. In particular, the invention described herein is directed to a method of enabling a CE (customer equipment) with a Frame Relay or ATM access (or other L-2 protocol) to be connected over a point-to-point link.

Such a CE appears as a node on a VPLS/emulated LAN, thereby allowing it to communicate with other CEs as if it is connected to the same LAN as the other CEs.

The separation of functionality between the CLEs and the PEs enables novel redundant configurations. In order to provide redundancy in the emulated LAN topology, there can be multiple hubs in the physical topology but only one node can be the root in the forwarding path determined by the spanning tree computation. In addition, each physical layer spoke may have multiple physical interfaces to a PE.

Link aggregation 802.3ad can be used to aggregate two physical links between the CE and PE (spoke/hub PE) to provide resilient CLE at customer site to PE at CO or provider site connectivity.

To provide resilient emulated LAN services, fast recovery of the service in the event of link failure in the provider network and/or hub CLE failure (spoke CLE failure by definition is not protected) is important. Also, the mechanism to provide the resilient emulated LAN service should require minimal changes in the existing CLEs, to reduce the cost of deployment. In particular, there should be no changes in the data path in spoke or branch office CLEs; however spoke CLEs may be updated with software changes in control plane. It is also desirable to hide link failures from hub or spoke bridges so that no spanning tree re-computation be required. However if a hub, which is a root of the spanning tree of the emulated LAN topology fails, spanning tree re-computation is not avoided and not made transparent to bridges. Nevertheless, with the use of RSTP (Rapid Spanning Tree Protocol), spanning tree convergence shall be quick if a hub CLE fails, since each CLE bridge has one peer only on each virtual port/link to its remote peer.

To connect all the CLEs, a current full-meshed topology without spanning tree requires $n^2$ VCs without protection/backup VCs; with protection VCs. A current full mesh topology requires $2 * n^2$ VCs. On the other hand, the mechanism according to the invention requires only $(n-1)$ VCs without redundant/protection VCs, and no more than $m*(n-1)$ with redundant VCs, where m is the number of VCs used to connect two CLEs.

With mechanisms that use full-meshed topology with a spanning tree algorithm, if there is a misconfiguration or redundant connection in the emulated LAN, use of the spanning tree algorithm prevents forwarding loops. In contrast, in full-meshed topologies without a STP, misconfiguration, and in particular misconfiguration of a protection VC as another primary VC, will result in forwarding loops.

The redundancy mechanism hides link failure from the hub/spokes bridges or more precisely, the spanning tree algorithm, while allowing rapid spanning tree convergence if a hub fails. This is enabled since each node has one peer only on each virtual port/point-to-point link to its remote peer, even if the access network is a LAN/Ethernet.

Figure 2:
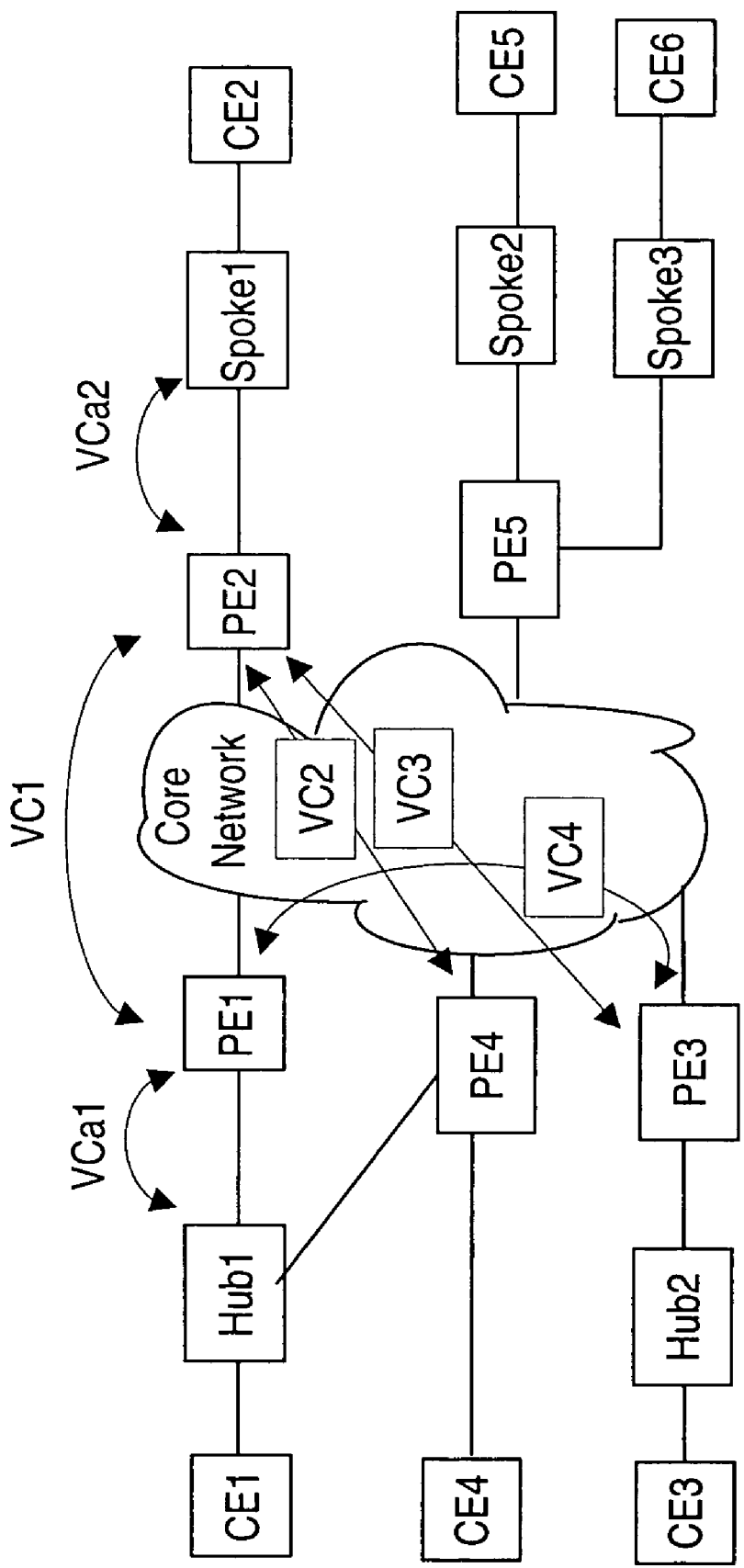
FIG. 2 shows an example of a VLAN with hub redundancy according to the invention.

FIG. 2 shows an example of a VLAN with hub redundancy according to the invention. Let's assume for the configuration shown in FIG. 2 that there are the following bidirectional point-to-point VCs (virtual circuits):

A PE1 to PE2 tunnel is used to transport traffic between Hub1 and Spoke1 uses a point-to-point Hub1 to Spoke1 VC (connecting PE1 to PE2), denoted with VC1.

A PE4 to PE2 tunnel is used to transport traffic between Hub1 and Spoke1 when the access VC from Hub1 to PE1 is down, is a point-to-point Hub1 to Spoke1 VC (between PE4 and PE2), denoted with VC2. It is to be noted that the point-to-point access VCs used between the CLEs and PEs in the access are denoted with VCa. A VCa spans from a CLE to the respective PE, and is mapped to the appropriate point-to-point VC across the core network. Thus, the access VC from Hub1 to PE1 is denoted with VCa1, and the access VC from Spoke 1 to PE2 is denoted with VCa2.

A PE3 to PE2 tunnel used to transport traffic between Hub2 and Spoke1 uses a point-to-point Hub2 to Spoke2 VC (connecting PE3 to PE2), denoted with VC3.

A PE1 to PE3 tunnel is used to transport traffic between Hub1 and Hub2 uses a point-to-point Hub1 to Hub2 VC (connecting PE1 to PE3), denoted with VC4.

As discussed above, the PEs distribute addresses to CLEs belonging to an emulated LAN. The hub CLEs are indicated in a VPN update message. BGP can be modified to distribute this information to the PEs. In the example of FIG. 2, both PE1 and PE4 advertise that Hub1 is reachable via PE1 and PE4 respectively. The PEs monitor the access link using the OAM signal.

If, for example, the access link VCa1 from PE1 to Hub1 is down, PE1 updates all PEs which have member CLEs connected to it, that Hub1 is no longer reachable via PE1. This information update may be sent using a protocol such as BGP. The other member PEs which have spoke CLEs connected to Hub1, switch traffic from the respective CLEs to the appropriate backup point-to-point VC, if available. For example, PE2 remaps the traffic from VCa2 to VC2.

If an alternate VC is available, the traffic is remapped on this alternate VC and if Hub1 is up, Spoke1 and the other CLE spokes shall be able to exchange bridge control messages via the alternate VCs. In this way, the failure of VCa1 is transparent to bridge control protocols. The switchover time should be smaller than the period within a bridge decides that the peer bridge is no longer reachable (i.e. the keep-alive period). This is necessary for preventing bridges from activating a redundant link between them. However in this example, this is not a concern for Spoke1 and Hub1, as Spoke1 does not have any redundant links to Hub1.

PE2 may switch traffic from Spoke1 to Hub1 to other VCs such as for example over VC2, or VC3, but this is transparent to Spoke1 and VCa2 is mapped to one and only one of the stated VCs at any time.

This mechanism does not preclude use of multiple point-to-point VCs between a spoke CLE and PE. It allows existing spoke CLEs, which may not be able to bridge traffic over a different VLAN (i.e. existing CLEs are not be able to bridge traffic using multiple VLAN tags as if there are different virtual ports), to be mapped to redundant PE to PE VCs configured in the provider network.

If after the traffic is remapped Hub1 is down, and after expiration of the keepalive period, Spoke1 and other CLE spokes determine that Hub1 is no longer reachable. In this case, Spoke1 signals to the attached PE2 that it wants to be connected to an alternate hub. PE2 remaps VCa2 from VC1 to VC3 and Spoke1 starts receiving bridge control messages from Hub2 instead. If the bridge root was previously Hub1, Hub2 is computed as the new root and RSTP on Spoke1 sets the respective virtual port in a forwarding state quickly (i.e. RSTP can converge quickly) since there is only one remote peer on VCa2.

If the access link layer is not down, but Hub1 is down, a CLE detects this situation via keepalive period and determines the alternate hub/root as described previously. Essentially if Hub1 is down, the CLEs requests the attached PE for an alternate hub connectivity. The CLEs only need to be upgraded with software to signal this request to PEs. When the access link layer is down, it cannot be determined if Hub1 bridge is down as well. Hence, the above mechanism first attempts to use an alternate path, if available, to reach the hub, while leaving subsequently to the spoke CLEs to detect if the bridge hub is down. Bridging protocol messages are exchanged over the alternate paths, but this is transparent to the bridge layer in CLEs. If the bridge layer is down, the CLE uses the existing spanning tree protocol (RSTP) to determine another hub/root.

In the event of an access link layer failure between a hub and the associated PE, as is for example VCa1 between Hub1 and PE1, bridge traffic can be forwarded over the alternate path quickly and transparent to the bridging protocols in CLEs.

In the event of a hub failure, since each CLE has only one peer over a virtual port/VC in the CLE traffic, RSTP can converge quickly and traffic can be forwarded over the new tree quickly. For the example of FIG. 2, initially, the Ethernet traffic from Spoke1 received at PE2 is mapped to VC1. PE1 monitors Hub1 to see if the hub or the link between the Hub1 and PE1 is down. If it is, PE1 signals to PE2 that the point-to-point Ethernet service from Hub1 to Spoke1 is down (the signalling may be performed using SONET/SDH overhead). PE2 then remaps the traffic from VC1 to VC3. If a hub fails, there is another hub for the spokes to connect to. Each hub and spoke also has redundant links to the provider network. If a link within the aggregated bundle of links is down, a spoke still has connectivity with the respective PE, although less bandwidth is available. The loss of a link in the bundle is transparent to the bridging entity in the spoke. This ensures a forwarding path without affecting the spanning tree.

Note that the above approach also implies that it is not necessary for an alternate point-to-point hub-spoke VC to be reserved for the customer while the current VC is functional. In this way, a provider may only have to provision a single point-to-point VC for the customer, since only one point-to-point connection uses network resources at any time. A spoke has only one point-to-point Ethernet connection to a hub at any point in time, i.e. a spoke does not require new multiplexing features to multiple destinations like a hub.

It is also to be noted that BGP may be modified to distribute the next hop for a primary route as well as a secondary route. The network should be designed such that the secondary path is disjoint from the primary path to ensure that if the primary path is no longer reachable, the secondary path is not likely to be affected.

The configuration of FIGS. 2A and 2B in the context of an emulated LAN as described in the parent Patent Application provides fast spanning tree protocol convergence, enabling a customer to use the existing CEs STP. The mechanism described above and the use of RSTP in CLEs as described in the following hide connectivity failure from CEs and CEs' STP. RSTP can converge quickly as long as there is only one CLE peering with one other CLE on a LAN link and on a point-to-point link. As shown, Hub1 only peers with Hub2 (i.e. some links are redundant).

This approach is not limited to a hub and spoke topology; however in other topologies not all links may be used in a spanning tree.

On the other hand, if the customer located equipment CLEs (hubs and spokes) are running spanning tree among themselves, the STP convergence will be slower. Hence, in order to allow rapid spanning tree convergence in the current VPL topologies, RSTP (rapid STP) needs to be used among the CLEs to allow rapid spanning tree convergence. While a service provider may implement RSTP, not all customer devices may support it, and may need to upgrade its network equipment to run RSTP.

In the resilient VLAN topology of FIGS. 2A and 2B, each physical layer spoke can have two physical interfaces to the provider network. Link aggregation (as described in IEEE802.4Ad) may be used to aggregate the two physical links between the spoke CLE and the respective PE. For the existing full-meshed topologies with redundant links, the current VPLS (virtual private LAN service) requires $2*O(n^2)$ for n sites, while the approach according to this invention requires O(n) connections, including the redundant links, to provide a resilient, fast recovery emulated LAN service.

If a link within this aggregated bundle is down, the spoke CLE still has connectivity to its associated PE, although less bandwidth is available. The loss of a link is nonetheless transparent to the bridging entity in the CLE at the respective spoke. This ensures a forwarding path without affecting the spanning tree.

One advantage of this service compared to a customer provisioned emulated LAN is that the provider manages the redundancy and it can better utilize or share backup links/resources in its network. If an end customer will provision the emulated LAN, an end customer will have to subscribe to additional point-to-point links for redundancy, and STP will converge slowly when a link goes down. The end customer can use this resilient emulated LAN service with existing CEs running STP. This mechanism hides link failure from CEs. Essentially, the provider has added value to the emulated LAN service (which an end customer could have provisioned him/herself)

Another advantage of this approach is that a point-to-point spoke does not need to allocate redundant resources for the customer while the point-to-point connection between the hub and the spoke is functional. In this way, a provider may only have to provision a single point-to-point connection, since only a connection uses the resources at any given time. This also means that a spoke does not require new multiplexing features to multiple destinations. This configuration provides a simple and inexpensive solution for enabling redundant hubs in an emulated LAN context.

Figure 3:
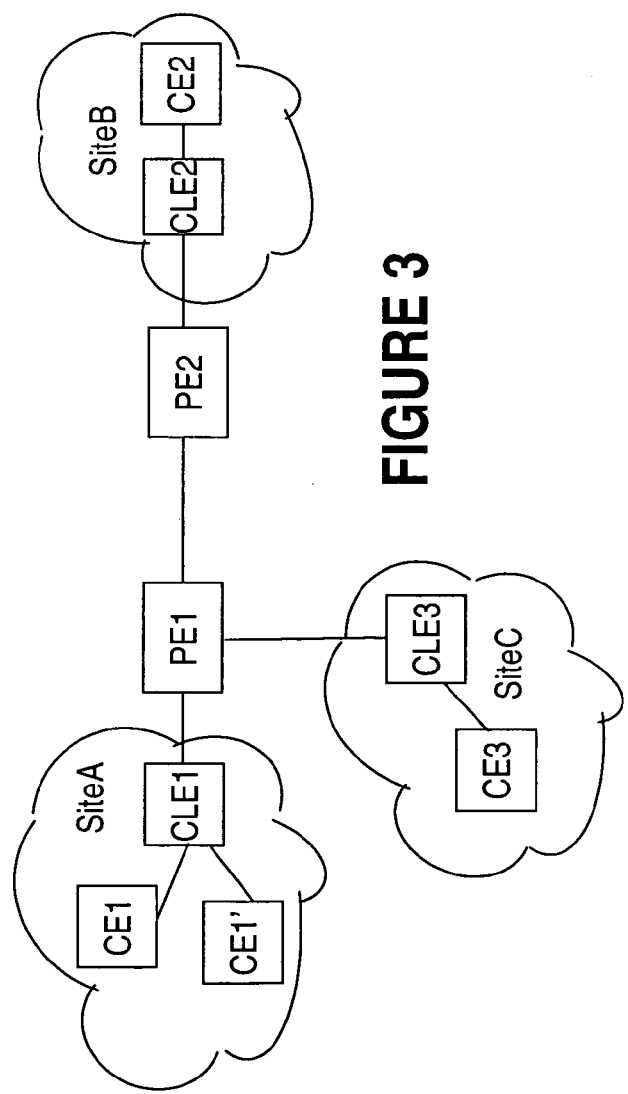
FIG. 3 illustrates an example of a fragment of an ELAN for explaining a new emulated LAN service model according to the invention.

A new emulated LAN service model is described here in connection with FIG. 3. By decoupling the point-to-point tunnel/NC switching from the multipoint switching, site-to-site service level agreement (SLA) can be provided independently of the multipoint switching of MAC addresses to different sites. In this way, a site-to-site, or UNI (user network interface)-to-UNI SLA may be specified for an emulated LAN service. As a result, an end customer is offered a multipoint emulated LAN service connecting all its sites and site-to-site bandwidth guarantees as well.

In the example of FIG. 3, there is a UNI SLA for the link between SiteA and SiteB and a UNI SLA from SiteA to SiteC. There is no UNI for the link between SiteC and SiteB.

A first VC1/tunnel is provisioned for traffic from SiteA to SiteC and a VC2/tunnel for the traffic from SiteB to SiteC. In the existing models, node PE1 multipoint switches the traffic towards either CE device CE2 or CE3. This requires node PE1 to inspect the destination MAC addresses for all frames to police the traffic going to different sites according to the respective SLA.

In the model according to the invention, the logical topology used to construct the customer emulated LAN is a link between CLE1 and CLE3 and another link between CLE3 and CLE2. CLE2 is a hub or multipoint switch for this customer network topology, while CLE1 is a spoke and does not perform multipoint switching for the customer traffic. Rather, CLE1 only switches the traffic for CE1 or CE2 on the corresponding point-to-point VC/tunnel mapped to the UNIs for each site, while CLE2 bridges the traffic from CLE3 over either the VC1 or VC2 to CLE1 or CLE2, respectively, as described below.

CLE1 sends traffic from CE1 on the first VC1/tunnel conforming to the SLA from SiteA to SiteC. CLE1 does not perform multipoint switching for this customer ELAN service and does not consider whether the traffic from CE1 should be placed on the VC2/tunnel from CLE2 to CLE3.

CLE2 acts as a multipoint switch for this topology, and decides whether the traffic from the CLE1 should be switched to CLE3 or CLE2. Traffic with destination MAC addresses learnt at CLE2 is bridged to CLE3 if the MAC address is learnt from the port from CLE3, and sent on the VC2/tunnel from CLE2 if the MAC address is learnt from the VC/tunnel for CLE2.

Another example may be provided for the configuration of FIG. 2, where the UNIs are numbered according to the respective node. Let's assume that the CIRs available for each connection are 10 Mbps for UNI1-UNI2, 1 Mbps for UNI1-UNI3, and 1 Mbps for UNI1-UNI4. We also assume that the UNI-UNI mapping to the respective tunnel is VC (virtual connection) mapping, whereby UNI1-UNI2 maps to a VC1, and UNI1-UNI3 maps to a VC2.

A simple way to enforce this service is to monitor or police the tunnel/VC between sites. For example, the provider can police and ensure that the traffic in VC1 (Hub1-Hub2) and VC2 (Hub1-Spoke3) are meeting the SLA, by rate-limiting the traffic in the VC to the CIR specified for each VC. Assuming bi-directional VCs, CLE Spoke3 sends traffic from CE3 on VC2 and there is no multipoint or bridging of traffic onto any other VC at Spoke3 in this case. Multipoint switching occurs only when more than two VCs are terminated at a CLE as in the case of Hub1 (or Hub2 when L1 or Hub1 goes down).

This site-to-site SLA model and enforcement is applicable to all types of topology including a full-meshed topology and a VPLS using split horizon switching. In other words, this SLA model is independent of hybrid VPLS mechanisms.

Use of site-to-site SLA describes above allows a provider to add value to emulated LAN service, by providing measurable SLA and not merely duplicating an emulated LAN service that end customers can provisioned themselves. In addition since the SLA can be specified clearly and the network service is resilient, this emulated LAN service also allows end customers to run VoIP and real-time services.

If different technologies are used in an access network, different access connection identifiers are needed in order to access the different peer remote sites. For the case when a Frame Relay (FR) link is used in the access network as shown by CE4 in FIG. 1, and all other sites use Ethernet, then the peer remote sites are differentiated at the customer site via the use of multiple DLCI (data link connection identifier) identifiers, regardless of the technologies used for their individual access network portions. This enables the emulated LAN to support heterogeneous access technologies. Only one DLCI (data link connection identifier) is required at this CE router to allow it to peer with the other CE routers on the emulated LAN.

This reduces the amount of provisioning required by end customers. Namely, instead of provisioning a plurality of point-to-point DLCIs and a plurality of subnets for the CE routers to peer, an end customer will only need one DLCI or Ethernet interface and IP addresses for one subnet for routers to peer with other routers on the emulated LAN.

In addition, when a new site (subnet) is added, only the new router needs to be provisioned and only one DLCI or one Ethernet interface is required.

Alternatively, if the existing FR CE devices are configured with routed encapsulation and it is not feasible to reconfigure the FR CE devices, some of the FR CE and Ethernet CE devices can be connected to different existing subnets instead, while still requiring only one DLCI or Ethernet interface at each site for all CEs to be interconnected. It is also to be noted that this does not prevent additional access interfaces to be used for redundancy.

Figure 4A:
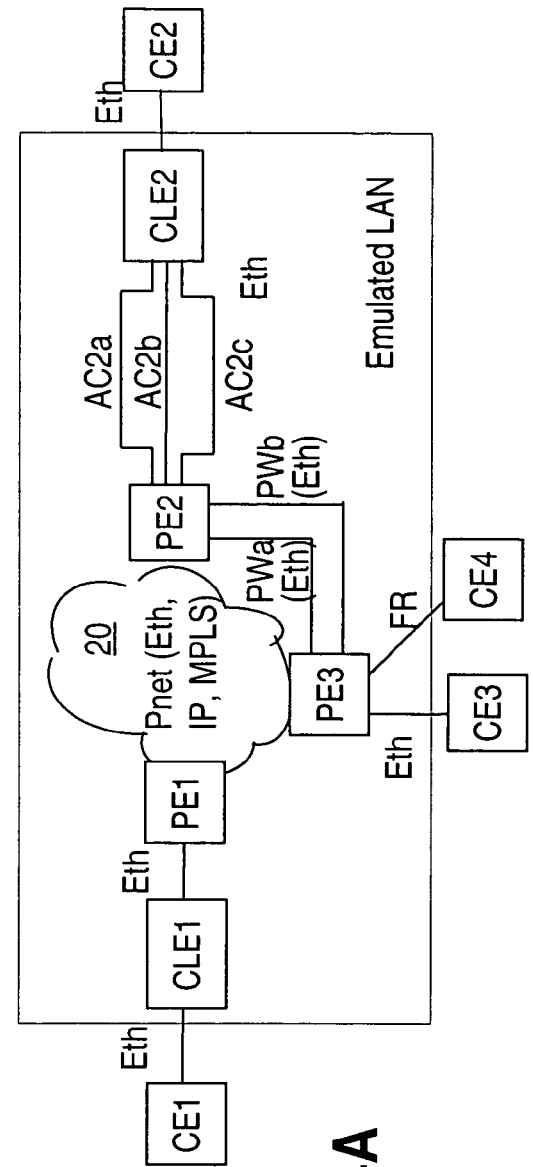
FIG. 4A illustrates an example of CE devices connected over an emulated LAN using bridged encapsulation of the traffic.
Figure 4B:
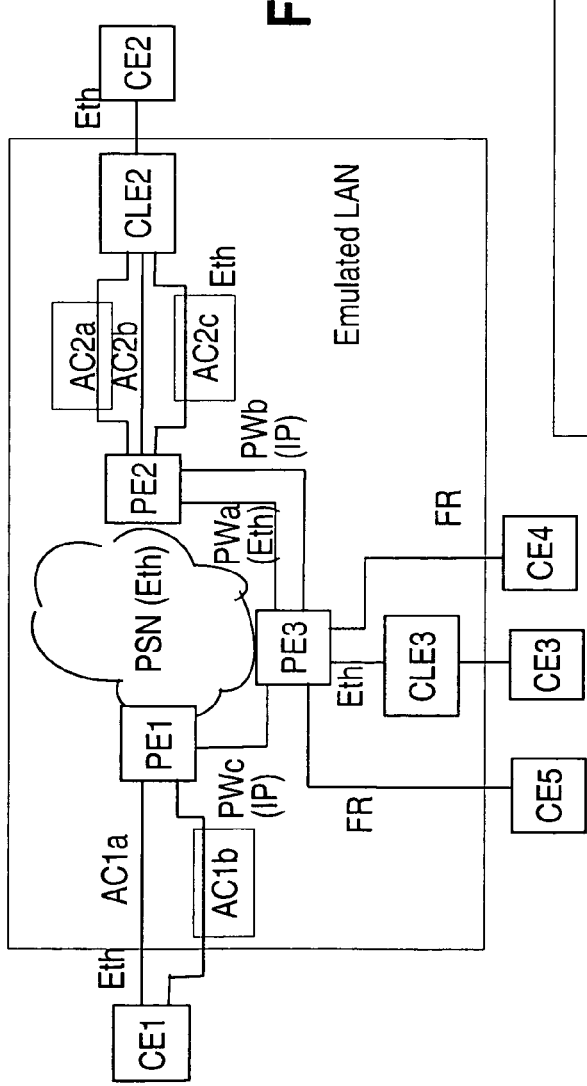
FIG. 4B illustrates an example of CE IP devices connected over multiple subnets using routed encapsulation of the traffic.
Figure 4C:
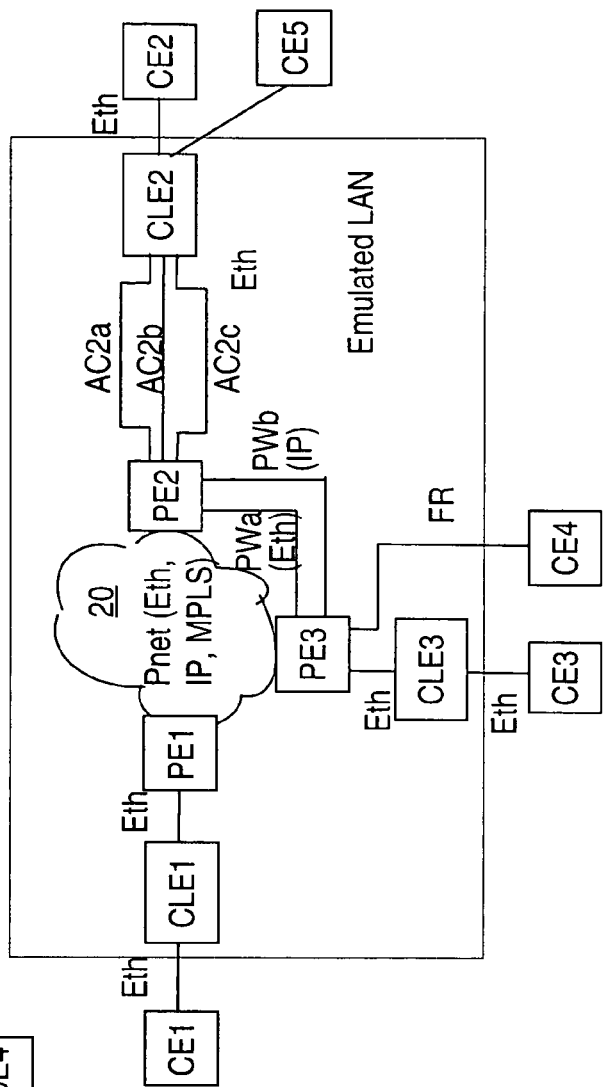
FIG. 4C shows another example of CE IP devices connected over a broadcast network.

There are a number of alternatives that can be used to enable a user to interconnect sites with different L-2 access technologies, as shown in FIGS. 4A-4C.

FIG. 4A illustrates CE devices connected over an emulated LAN using bridged encapsulation. This method allows CEs connected to different access technologies to peer on the emulated LAN, by encapsulating traffic (including L-3 routed traffic such as IP) in Ethernet frames, hence L-3 traffic is able to work as if the devices are connected over a LAN. Traffic from the different access technologies is decapsulated or demultiplexed and Ethernet frames are transported over the PWs (point-to-point tunnels) from PE to PE and bridged in CLEs as described in the parent patent application.

In the example of FIG. 4A, FR or ATM traffic from CE4 is bridged encapsulated as known, the FR/ATM headers are decapsulated at PE3 and the traffic is transported over provider network in PWb, Ethernet or other (MPLS, IP) protocols. Let's assume that the provider network uses Ethernet. At PE2, the Ethernet frames are decapsulated and sent to CLE2, which bridges the traffic as needed.

Similarly, the Ethernet traffic from CE2 is bridged in CLE2, decapsulated at PE2 and transported over an Ethernet PW to PE3 (e.g. PWa). At PE3, the Ethernet frames are decapsulated and bridged encapsulated before being sent to CE4. It is to be noted that the connections between PE2 and PE3, which are in fact tunnels over the provider's network are illustrated outside the network 20 for specifically illustrating the path between CE54 and CE2 and that the protocol used is in this example Ethernet over service provider network.

When CEs with different access technologies are used in an emulated VLAN an in FIG. 1, this method requires less changes in the provider network, and scales better than the other methods described here. However, it requires the ability to reconfigure the CEs with the different access technology (e.g. FR/ATM CEs), to enable use of bridged encapsulation for the traffic from the customer site (including routed traffic e.g. IP).

Routed encapsulation method is illustrated in FIG. 4B. This method allows a CE with FR/ATM access to peer with a CE with Ethernet access over a different subnet than the emulated LAN used by CEs with Ethernet access at that site, allowing an FR/ATM CE to maintain the same configuration as before.

The CE1 in FIG. 4B exchanges traffic with the peer CEs behind the respective CLEs over AC1a to the PE1 and the respective PW channels in the service provider network 20. An additional CE5 is shown in FIG. 4B, with a FR access protocol (or other L-2 protocol). In order to exchange traffic with CE5, CE1 is provided with an additional AC1b to PE1 and an IP tunnel PWc is also provided between PE1 and PE3.

As indicated above, if a number of end customer sites are large, grouping sites into different subnets/emulated LAN is a better approach than to scale the VPL design, even for CEs with Ethernet access only. This is independent of the reasons or need to use routed encapsulation over FR/ATM access. By grouping the sites into subnets/emulated LANs, the provisioning required for peering some L-3 devices over a subnet or emulated LAN is relaxed. The disadvantage is that some CEs with Ethernet access would need to be configured to peer with multiple FR/ATM sites on separate subnets instead of within one subnet (as with other CEs with Ethernet sites), even for a VPN with a relatively smaller number of sites. The next alternative (routed encapsulation over a broadcast network) overcomes this issue but introduces additional L3 configuration changes in L3 CE devices).

The routed encapsulation over a broadcast network is described in connection with FIG. 4C. This method allows all CEs to peer over the same emulated LAN or subnets, but requires configuration changes in L-3 protocols on FR/ATM CEs. This involves for example changing OSPF 'Interface Type' to the broadcast mode, and therefore might not be feasible in some deployments. As in the previous alternative, this method allows CE devices which are not able (for whatever reason) to use bridged encapsulation instead of routed encapsulation, to peer over different subnets of the same emulated LAN.

Additional mechanisms are required for routed encapsulation. Thus, an ARP (address resolution protocol) mediation mechanism is proposed for enabling operation of a point-to-point PW with two different access media when carrying IP traffic. In this case, the PW connects an Ethernet end to an IP end, such as PWb in FIGS. 4B and 4C. Even though the transport of traffic on the PWs is point-to-point, the MAC layer is still a multipoint service at the Ethernet end. For example, a customer may use a point-to-point Ethernet service carrying IP traffic, but the customer may have more than one MAC device on the MAC layer at the Ethernet end. These mechanisms also consider that there may be more than one MAC device/address at the Ethernet end, although there is only one device at the FR/ATM end.

When one end of the service is the point-to-point in nature and the other end is a shared media, currently there are no Ethernet names/addresses provided from the point-to-point end, when the traffic encapsulation is used. It is to be noted that this is available in the bridged encapsulation alternative. ARP mediation mechanisms are proposed for discovering the MAC address of a network device at the Ethernet site, discovering the MAC address of a network device at the FR/ATM site, and for encapsulation of the traffic generated at the Ethernet site and of the traffic generated at the FR/ATM site.

Discovering the MAC Address of a Network Device at the Ethernet Site

FIG. 4C shows a FR CE device, CE4, connected to the emulated LAN. The traffic from CE4 is routed encapsulated at the FR/ATM access link denoted with FR. The traffic is decapsulated at PE3, but only the network address for the destination (CE2) is available, not the MAC address on the subnet. PE2 needs to determine the MAC address corresponding to the network address on the shared media end. As shown in FIG. 4C at CE5, it is possible that there are other MAC devices on the same subnet as CE2. In the case of IP traffic, if CE routers support Proxy ARP, when PE2 receives an IP packet from the PWb for an unknown address, PE2 as a Proxy ARP sends an ARP request for the MAC address corresponding to the IP address of the packet to the emulated LAN via AC2c. PE2 caches the MAC address learned in the ARP reply for the corresponding IP address for future use.

If the IP address belongs to a device on the respective subnet (such as CE3), PE3 receives a response from the IP device itself. If the IP address belongs to a device on another subnet (e.g. CE1), the Proxy ARP in Ethernet CE routers responds with its own MAC address.

In the case of an IS-IS protocol or where an IP CE router supports the ICMP (Internet Control Message Protocol) router discovery protocol (IRDP), PE2 listens for router advertisement messages on AC2c to discover a router to forward the Ethernet frame to. If the selected router is not the optimal router on the respective subnet (a selected router is not optimal if the router is not the shortest path next-hop to the destination), a redirect message is sent towards the source of the packet to inform it of the optimal router so that subsequent packets be sent to the next-hop router (the optimal router).

In the case of the IS-IS protocol, where the optimal router MAC address is indicated in the IP packet, an additional step is required. Namely, PE2 sends an ARP request for the IP address of the optimal router to learn the corresponding MAC address. PE2 caches the destination network address the redirect message is meant for and the corresponding MAC address of the optimal router, and forwards subsequent packets for that MAC address.

Once PE2 receives has a corresponding learned MAC address for a packet received from the PWb (IP over provider network) it encapsulates the packet in an Ethernet frame with the learned MAC address and sends the Ethernet frame towards CE2 via AC2c. From there on, CLE2 bridges the Ethernet traffic as described for emulated LAN service in the parent Patent Application.

Discovering the MAC Address of a Network Device at the FR/ATM Site

To discover the MAC address corresponding to the network address of a CE device such as CE5 of FIG. 4B, the following mechanism is required.

The device sending the packet, for example CE1, uses the defined standard specification for the routed protocol. For example, if CE1 is an IP device, it sends an ARP request for the IP destination address of device CE5 via AC1b. PE1 acts as a Proxy ARP and responds with its own MAC address for the IP address, if the IP address belongs to a device on a remote end of an IP over provider network PW (PWc in the example). PE1 should be configured a priori with the network addresses of all such remote FR/ATM CEs (one network address for each FR/ATM CE). Alternatively, PE3 may use Inverse ARP capabilities to discover the IP address of the destination FR/ATM CE or use another mechanism, for example PW signaling, to relay the IP address of CE5 to PE1.

In the same example shown in FIG. 4B, PE1 decapsulates the IP traffic from the Ethernet frame and encapsulates the IP traffic in PWc (IP over provider's network) using as Type "IP Layer2 Transport". The traffic is sent to PE3. PE3 decapsulates the IP packets from the PWc and encapsulates the packets in routed encapsulation to CE5, as known.

PE3 decapsulates the IP traffic from FR/ATM CE5. PE3 encapsulates the IP traffic in PWc, using as Type "IP Layer2 Transport". The traffic is sent to PE1. PE1 decapsulates the IP traffic from the PWc and encapsulates it in an Ethernet frame with an appropriate VLAN tag before sending it on AC1b to CE1.

As indicated above, for routed encapsulation over a point-to-point link and routed encapsulation over a broadcast network, the Ethernet CE devices should be IP devices (routers and hosts) able to respond to an ARP request and IP routers are Proxy ARP for the routes it can forward/route over. Alternatively, these should be devices enabled with a router advertisement protocol such as IS-IS or IDRP.

I claim:

1. A redundant hub-spoke virtual private LAN (VPN) having a plurality of emulated LANs (ELANs), each connected at a provider edge (PE) node over a service provider network, comprising:
    a first hub node serving client equipment (CE) devices connected on a first ELAN, connected at a first of said PE nodes, capable of performing as a root bridge node of the VPN;
    a spoke node connected to a second of said PE nodes, serving CE devices on a second ELAN;
    a second hub node connected to a third of said PE nodes, interconnected with said first hub node through said service provider network and said first and third PE nodes
    wherein said first PE node and said second PE node connect through said service provider network to form a first point-to-point link L1 interconnecting said first hub node and said spoke node,
    wherein at least one of said first, second and third PE nodes detect a failure associated with said first hub node and, in response to said detecting, of sending a failure notice,
    wherein said third PE and said second PE, in response to said failure notice, establish a redundant point-to-point link L2 through said service provider network, L2 interconnecting said second hub node and said spoke, and
    wherein, in response to said failure notice, said second hub node performs as the root bridge node of the VPN.

2. The redundant hub-spoke VPN of claim 1, wherein said second hub node operates as a spoke node of first said hub node based on an absence of said failure notice.

3. The redundant hub-spoke VPN of claim 1, wherein said first hub node is capable of operating as a spoke node of said second hub node in response to said failure notice.

4. The redundant hub-spoke VPN of claim 1,
    wherein said establishing a redundant point-to-point link L2 in response to said failure notice includes, said first PE node signaling said second PE node to establish a second point-to-point link with said second hub node, and to re-map the traffic from said second hub node over said second point-to-point link and, in response, said second PE node establishes the second point-to-point link with said second hub node, and re-maps the traffic from said second hub node over said second point-to-point link.

5. The redundant hub-spoke VPN of claim 1, wherein said spoke node and said second PE node are connected by an access link including an aggregated bundle of links comprising a redundant link.

6. The redundant hub-spoke VPN of claim 5, wherein connectivity between said second PE node and said spoke node is maintained when a link on said respective aggregated bundle is interrupted.

7. The redundant hub-spoke VPN of claim 6, wherein the loss of a link in said aggregated bundle is transparent to said spoke node.

8. In a hub-spoke virtual private LAN (VPN) of the type having a plurality of emulated LANs (ELANs), each connected at a service provider edge (PE) node of a service provider network over an access link, the VPN having a first hub node, connected to the service provider network at a first PE node and a first spoke node, connected to the service provider network at a second PE node, a method for recovering the traffic in case of a failure, comprising:
    establishing the first hub node as the root bridge node of said VPN;
    transmitting traffic from the first hub node to the first spoke node over a first point-to-point link established between the first PE node and the second PE node;
    providing a second hub node, connected to the service provider network at a third PE node, connected to said first hub node by a second point-to-point link between said first PE node and said third PE node;
    at said second PE node, monitoring a the traffic on said first point-to-point link to detect a fault and, responsive to said detecting a fault, signaling said fault from said second PE node, establishing said second hub node as the root bridge node of said VPN, and establishing a third point-to-point link between the third PE node at said second hub node and said second PE node.

9. The method of claim 8, wherein said transmitting traffic from the first hub node to the spoke node comprises:
   at said first hub node, bridging the traffic destined to said spoke node of said first hub node toward said first PE node;
   at said first PE node, tunneling the traffic received from said first hub node along said first point-to-point link to said second PE node;
   at said third PE node, mapping the traffic received over said first point-to-point link to said first spoke node; and
   at said first spoke node, bridging the traffic received from said second PE node.

10. The method of claim 8, wherein said signaling said fault from said second PE node to said first PE node comprises using a Layer 1 signaling protocol.

11. The method of claim 8, further comprising operating said second hub node as a second spoke node of said first hub node absent said monitoring detecting a fault.

12. The method of claim 8, further comprising:
   responsive to said detecting a fault operating said first hub node as a spoke node of said second hub node.

13. The method of claim 8, wherein first and second point-to-point links connections are point-to-point Ethernet tunnels.

14. The method of claim 8, wherein the access link between said second PE node and said first spoke node of said first hub node is an aggregated bundle of links comprising a redundant link.

15. The method of claim 14, wherein connectivity between second PE node and said first spoke node of said first hub node is maintained when a link on said aggregated bundle is interrupted.

16. The method of claim 15, wherein the loss of a link in said aggregated bundle is transparent to said first spoke node.

* * * * *

UNITED STATES PATENT AND TRADEMARK OFFICE
CERTIFICATE OF CORRECTION

PATENT NO. : 7,619,966 B2  Page 1 of 1
APPLICATION NO. : 10/724775
DATED : November 17, 2009
INVENTOR(S) : Cheng-Yin Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1561 days.

Signed and Sealed this

Fourteenth Day of December, 2010

David J. Kappos
*Director of the United States Patent and Trademark Office*